(12) United States Patent
Bradfield

(10) Patent No.: US 8,749,103 B2
(45) Date of Patent: Jun. 10, 2014

(54) PERMANENT MAGNET ROTOR FOR ELECTRIC MACHINE

(75) Inventor: Michael D. Bradfield, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 679 days.

(21) Appl. No.: 12/882,370

(22) Filed: Sep. 15, 2010

(65) Prior Publication Data

US 2012/0062054 A1   Mar. 15, 2012

(51) Int. Cl.
*H02K 21/12* (2006.01)
*H02K 1/32* (2006.01)

(52) U.S. Cl.
USPC ............... 310/156.53; 310/156.56; 310/64; 310/156.74; 310/156.77

(58) Field of Classification Search
CPC .... H02K 1/276; H02K 1/2766; H02K 1/2773
USPC ............... 310/64, 156.53, 156.56, 156.74, 310/156.75, 156.77
IPC ............................. H02K 21/12, 1/32
See application file for complete search history.

(56) References Cited

U.S. PATENT DOCUMENTS

| | | | | |
|---|---|---|---|---|
| 4,939,398 | A * | 7/1990 | Lloyd | 310/156.53 |
| 5,159,220 | A * | 10/1992 | Kliman | 310/156.56 |
| 6,342,745 | B1 * | 1/2002 | Sakai et al. | 310/156.56 |
| 6,509,664 | B2 * | 1/2003 | Shah et al. | 310/181 |
| 7,183,686 | B2 * | 2/2007 | Sasaki et al. | 310/156.78 |
| 7,372,183 | B2 * | 5/2008 | Sasaki et al. | 310/156.78 |
| 2005/0017588 | A1 * | 1/2005 | Yamaguchi | 310/156.45 |
| 2007/0096578 | A1 * | 5/2007 | Jahns et al. | 310/156.53 |
| 2008/0136281 | A1 * | 6/2008 | Fujii et al. | 310/156.08 |
| 2009/0160284 | A1 * | 6/2009 | Kimura et al. | 310/156.53 |
| 2009/0224624 | A1 | 9/2009 | Kumar et al. | |
| 2009/0261667 | A1 * | 10/2009 | Matsubara et al. | 310/54 |

FOREIGN PATENT DOCUMENTS

| | | | |
|---|---|---|---|
| JP | 2002171702 A | * | 6/2002 |
| JP | 2003209941 A | | 7/2003 |
| JP | 2004260920 A | * | 9/2004 |
| JP | 200594941 A | | 4/2005 |
| JP | 2005124386 A | | 5/2005 |
| JP | 2008187778 A | | 8/2008 |
| JP | 2009232557 A | * | 10/2009 |
| JP | 2010220402 A | | 9/2010 |
| WO | 2012036945 A2 | | 3/2012 |

OTHER PUBLICATIONS

Machine Translation JP 2002-171702A.*
Machine Translation JP 2004-260920A.*
Machine Translation JP 2009-232557A.*
The Aluminum Association, www.aluminum.org, 2008, http://www.aluminum.org/Content/NavigationMenu/TheIndustry/Alloys/default.htm.*
Search Report and Written Opinion dated Apr. 9, 2012 for corresponding Application No. PCT/US2011/050628 (9 pages).

* cited by examiner

*Primary Examiner* — Terrance Kenerly
(74) *Attorney, Agent, or Firm* — Cantor Colburn LLP

(57) ABSTRACT

A permanent magnet rotor assembly for an electric machine includes a rotor core including one or more axially-extending openings and one or more permanent magnets located in the one or more axially-extending openings defining one or more gaps between the one or more permanent magnets and the one or more axially-extending openings. One or more thermally-conductive bars are located in the one or more gaps to transfer thermal energy from an interior of the rotor assembly toward an axial end of the rotor assembly.

18 Claims, 3 Drawing Sheets

PERMANENT MAGNET ROTOR FOR ELECTRIC MACHINE

BACKGROUND

The subject matter disclosed herein relates generally to electric machines. More specifically, the subject disclosure relates to permanent magnet rotor construction for electric machines.

Typical permanent magnet rotors used in electric machines, such as hybrid motors, include slots extending through a rotor lamination stack to receive the permanent magnets. The slots are typically oval in shape, and receive rectangular magnets, so there are gaps between each slot and each magnet. This gap is then injected molded with nylon or filled with an epoxy or varnish material to fill the gap.

Cooling the permanent magnets in such a rotor is a challenge. Operation of the rotor at elevated temperatures causes degradation in magnet performance, and even demagnetization of the magnets resulting in failure of the motor.

BRIEF DESCRIPTION

A permanent magnet rotor assembly for an electric machine includes a rotor core including one or more axially-extending openings and one or more permanent magnets located in the one or more axially-extending openings defining one or more gaps between the one or more permanent magnets and the one or more axially-extending openings. One or more thermally-conductive bars are located in the one or more gaps to transfer thermal energy from an interior of the rotor assembly toward an axial end of the rotor assembly.

An electric machine for a motor vehicle includes a stator, and a rotor assembly located at a central axis of the electric machine and interactive with the stator. The rotor assembly includes a rotor core having one or more axially-extending openings and one or more permanent magnets located in the one or more axially-extending openings defining one or more gaps between the one or more permanent magnets and the one or more axially-extending openings. One or more thermally-conductive bars are located in the one or more gaps to transfer thermal energy from an interior of the rotor assembly toward an axial end of the rotor assembly.

A method of cooling a rotor of a permanent magnet electric machine includes locating one or more thermally conductive bars in one or more axially-extending openings in a rotor core. Thermal energy is transferred to the one or more thermally conductive bars from the rotor and is transferred along a length of the one or more conductive bars to an axial end of the rotor. The thermal energy is dissipated from the axial end of the rotor.

The detailed description explains embodiments of the invention, together with advantages and features, by way of example with reference to the drawings.

DETAILED DESCRIPTION

Figure 1:
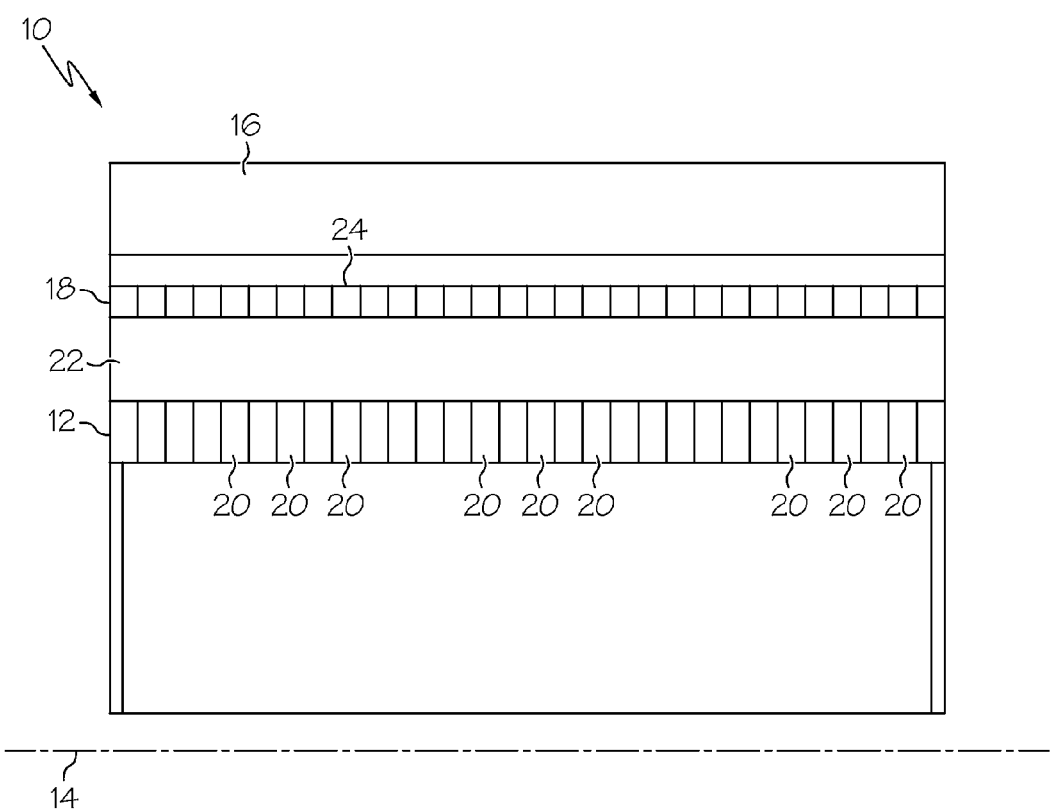
FIG. 1 is a cross-sectional view of an embodiment of a permanent magnet electric machine.
Figure 2:
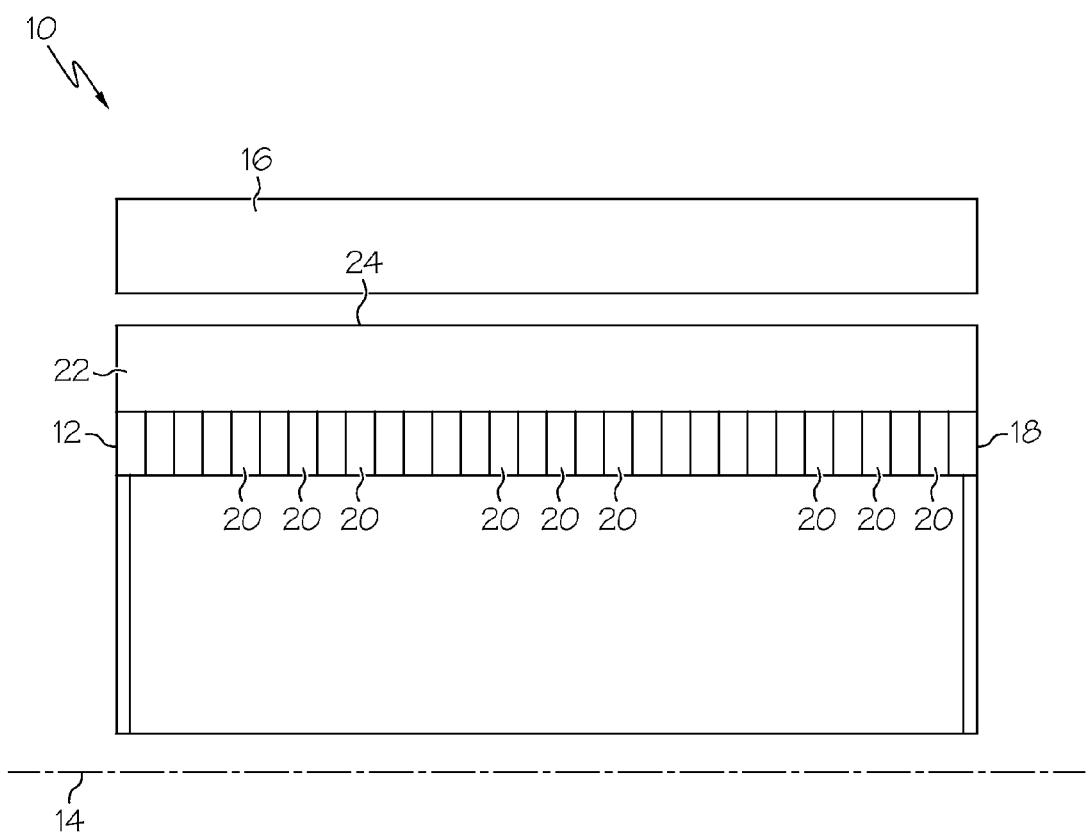
FIG. 2 is a cross-sectional view of another embodiment of a permanent magnet electric machine.

Shown in FIG. 1 is an embodiment of an electric machine 10. In some embodiments, the electric machine 10 is a motor for a hybrid vehicle or an electric vehicle. The electric machine 10 includes a rotor 12 rotably secured about a central axis 14 of the electric machine 10. A stator 16 is located to be interactive with the rotor 12. The rotor 12 includes a rotor core 18, which in some embodiments is formed from a plurality of rotor laminations 20 stacked along the axis 14. The rotor laminations 20 are typically formed from a metallic material, for example, steel. The rotor core 18 includes a plurality of axially-extending magnet openings 22. The magnet openings 22 may have a closed cross-section or, as shown in FIG. 2, may have a cross-section which breaks through an outer perimetrical surface 24 of the rotor core 18.

Figure 3:
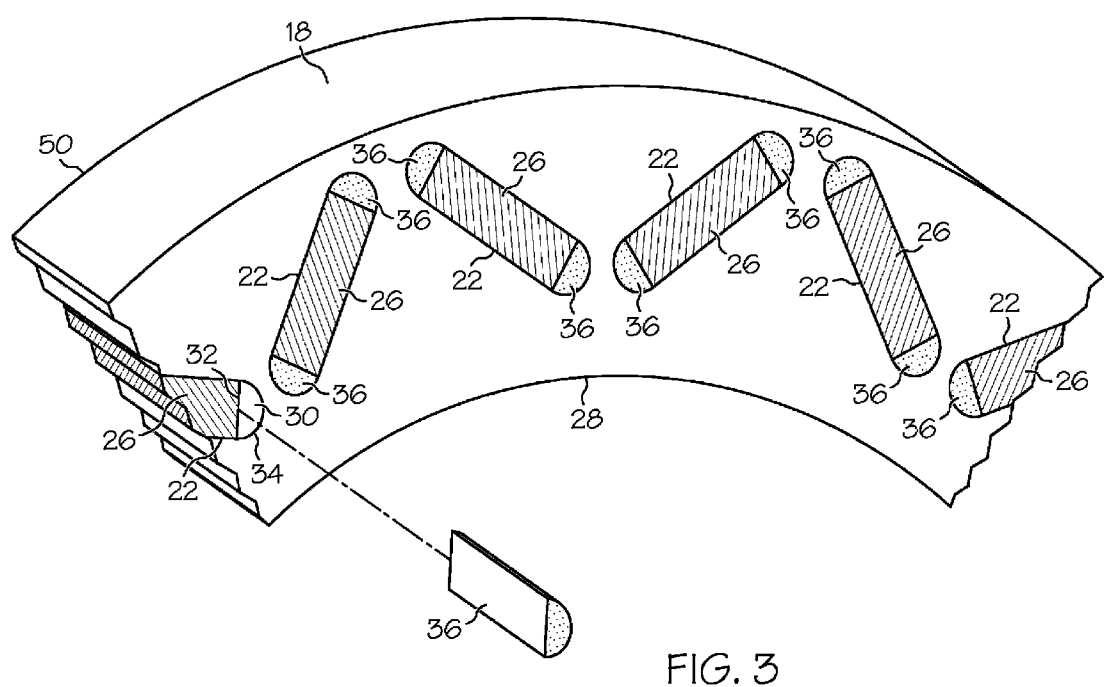
FIG. 3 is a partial perspective view of an embodiment of a rotor of a permanent magnet electric machine.

Referring now to FIG. 3, a plurality of rotor magnets 26 are located in the plurality of magnet openings 22. In the embodiment of FIG. 3, one rotor magnet 26 is located in each magnet opening 22, but it is to be appreciated any suitable number of rotor magnets 26, for example, two or more rotor magnets 26, may be located in the magnet openings 22. The rotor magnets 26 extend from a first axial end 28 of the rotor core 18 to a second axial end 50 of the rotor core 18, and have a cross-section such that when the rotor magnet 26 is inserted into the magnet opening 22, there is a gap 30 between a lateral end 32 of the rotor magnet 26 and a magnet opening wall 34. In some embodiments, the gap 30 is a result of the rotor magnet 26 having a rectangular cross-section and the magnet opening 22 having an oval or elliptical cross-section. The gap 30 is included by design and serves both magnetic and structural purposes. Magnetically, the gap aids in preventing short-circuiting of magnetic flux from the rotor magnet 26. The rotor magnets 26 are magnetized such that a direction of magnetization is along the lateral ends 32 of the rotor magnets 26, thus without the presence of the gap 30, a short circuit path would exist for the magnetic flux. Additionally, the gap 30 between the rotor laminations 20 and the rotor magnets 26 at the lateral ends 32 aids in preventing demagnetization of the rotor magnets 26 during operation of the electric machine 10. Further, rounded ends of the magnet opening 22 reduce stress concentrations in the rotor laminations 20 compared to magnet openings 22 having sharp corners.

A thermally conductive bar 36 extending a length of the magnet opening 22 is installed in the gap 30. In some embodiments, the conductive bar 36 is formed from an aluminum or copper based material. An aluminum based conductive bar 36 has a thermal conductivity about 4 times that of the steel rotor laminations 20, while a copper based conductive bar 36 has a thermal conductivity about 8 times that of the rotor laminations 20. In some embodiments, the conductive bar 36 is a single, solid piece of material, while in other embodiments, the conductive bar 36 may be a tubular form or other hollow shape. Further the conductive bar 36 may comprise more than one piece of material, or may be formed of more than one type of material. For example, the conductive bar 36 may be a layered structure including layers of conductive materials arranged to form the conductive bar 36. It is to be appreciated that the conductive bar 36 structures described herein are merely exemplary, and that other conductive bar 36 structures are contemplated by the present disclosure. During operation of the electric machine 10, the rotor 12, and particularly the rotor magnets 26 increase in temperature, with the greatest temperature occurring at or near an axial midpoint of the rotor 12. The conductive bars 36 are utilized to transfer thermal energy from the interior of the rotor 12 toward the axial ends 28, 50 of the rotor 12 where the thermal energy can be dissipated by the cooling system (either fluid or air cooled) of the electric machine 10. Locating the conductive bars 36 in the magnet opening 22 with the rotor magnet 26, closest to the accumulated thermal energy, increases effectiveness of the thermal energy removal by the conductive bars 36 over locating the conductive bars elsewhere in the rotor 12.

In some electric machines 10, eddy current within the conductive bars 36 may cause operability problems for the electric machine 10. In such cases, the conductive bars 36 may be formed from a powdered metal, such as aluminum or copper. The flakes or particles of powdered metal are individually coated with a magnetically and electrically insulative material, such that a magnetic and electrical barrier is formed to prevent the eddy current problems, while the conductive bar 36 retains its thermal conductivity.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A permanent magnet rotor assembly for an electric machine comprising:
   a rotor core including one or more axially-extending openings;
   one or more permanent magnets disposed in the one or more axially-extending openings defining one or more gaps between the one or more permanent magnets and the one or more axially-extending openings; and
   one or more thermally-conductive bars formed from a powdered metal material disposed in and configured to substantially fill an entirety of the one or more gaps to transfer thermal energy from an interior of the rotor assembly toward an axial end of the rotor assembly.

2. The rotor assembly of claim 1, wherein the one or more conductive bars are disposed between the one or more permanent magnets and a wall of the axially-extending opening.

3. The rotor assembly of claim 1, wherein the one or more axially-extending openings have a closed cross-section.

4. The rotor assembly of claim 3, wherein the closed cross-section is substantially oval.

5. The rotor assembly of claim 1, wherein the one or more axially-extending openings extend from a first axial end of the rotor core to a second axial end of the rotor core.

6. The rotor assembly of claim 1, wherein the one or more thermally-conductive bars are formed from an aluminum or copper based material.

7. A permanent magnet rotor assembly for an electric machine comprising:
   a rotor core including one or more axially-extending openings;
   one or more permanent magnets disposed in the one or more axially-extending openings defining one or more gaps between the one or more permanent magnets and the one or more axially-extending openings; and
   one or more thermally-conductive bars disposed in the one or more gaps to transfer thermal energy from an interior of the rotor assembly toward an axial end of the rotor assembly,
   wherein the one or more thermally-conductive bars are formed from a powdered metal material and wherein particles of the powdered metal are individually coated with a magnetically and/or electrically insulative material.

8. An electric machine comprising:
   a stator;
   a rotor assembly disposed at a central axis of the electric machine and interactive with the stator, the rotor assembly including:
   a rotor core including axially-extending openings, each axially extending opening including a first portion having opposite straight edges and second portions at opposite ends of the first portion, each of the second portions having a rounded edge tangentially connected at opposite ends thereof to each of the opposite straight edges of the first portion; permanent magnets disposed in the first portions of the axially-extending openings to define gaps between the permanent magnets and the axially-extending openings at the second portions; and
   thermally-conductive bars formed from a powdered metal material disposed in the gaps to transfer thermal energy from an interior of the rotor assembly toward an axial end of the rotor assembly.

9. The electric machine of claim 8, wherein the thermally-conductive bars are disposed between the permanent magnets and walls of the axially-extending openings.

10. The electric machine of claim 8, wherein the axially-extending openings have closed cross-sections.

11. The electric machine of claim 10, wherein the closed cross-sections are substantially oval.

12. The electric machine of claim 8, wherein the axially-extending openings extend from a first axial end of the rotor core to a second axial end of the rotor core.

13. The electric machine of claim 8, wherein the thermally-conductive bars are formed from an aluminum or copper based material.

14. An electric machine comprising:
   a stator;
   a rotor assembly disposed at a central axis of the electric machine and interactive with the stator, the rotor assembly including:
   a rotor core including one or more axially-extending openings;
   one or more permanent magnets disposed in the one or more axially-extending openings defining one or more gaps between the one or more permanent magnets and the one or more axially-extending openings; and
   one or more thermally-conductive bars disposed in the one or more gaps to transfer thermal energy from an interior of the rotor assembly toward an axial end of the rotor assembly,
   wherein the one or more thermally-conductive bars are formed from a powdered metal material and wherein particles of the powdered metal are individually coated with a magnetically and/or electrically insulative material.

15. The electric machine of claim 8, wherein the electric machine is a hybrid motor.

16. A method of cooling a rotor of a permanent magnet electric machine comprising:
   disposing one or more permanent magnets in one or more axially extending openings in a rotor core to define one or more associated gaps, each of the one or more axially extending openings having an annular cross-section;

disposing one or more thermally conductive bars formed of powdered metal material in the one or more associated gaps defined in the one or more axially-extending openings in the rotor core;

transferring thermal energy to the one or more thermally conductive bars from the rotor; and transferring the thermal energy along a length of the one or more conductive bars to an axial end of the rotor; and dissipating the thermal energy from the axial end of the rotor.

17. The rotor assembly of claim 1, wherein each axially extending opening includes a first portion having opposite straight edges and second portions at opposite ends of the first portion, each of the second portions having a rounded edge tangentially connected at opposite ends thereof to each of the opposite straight edges of the first portion.

18. The method of claim 16, further comprising forming the one or more thermally conductive bars such that the one or more thermally conductive bars fill respective entireties of the one or more associated gaps.

\* \* \* \* \*